UNITED STATES PATENT OFFICE.

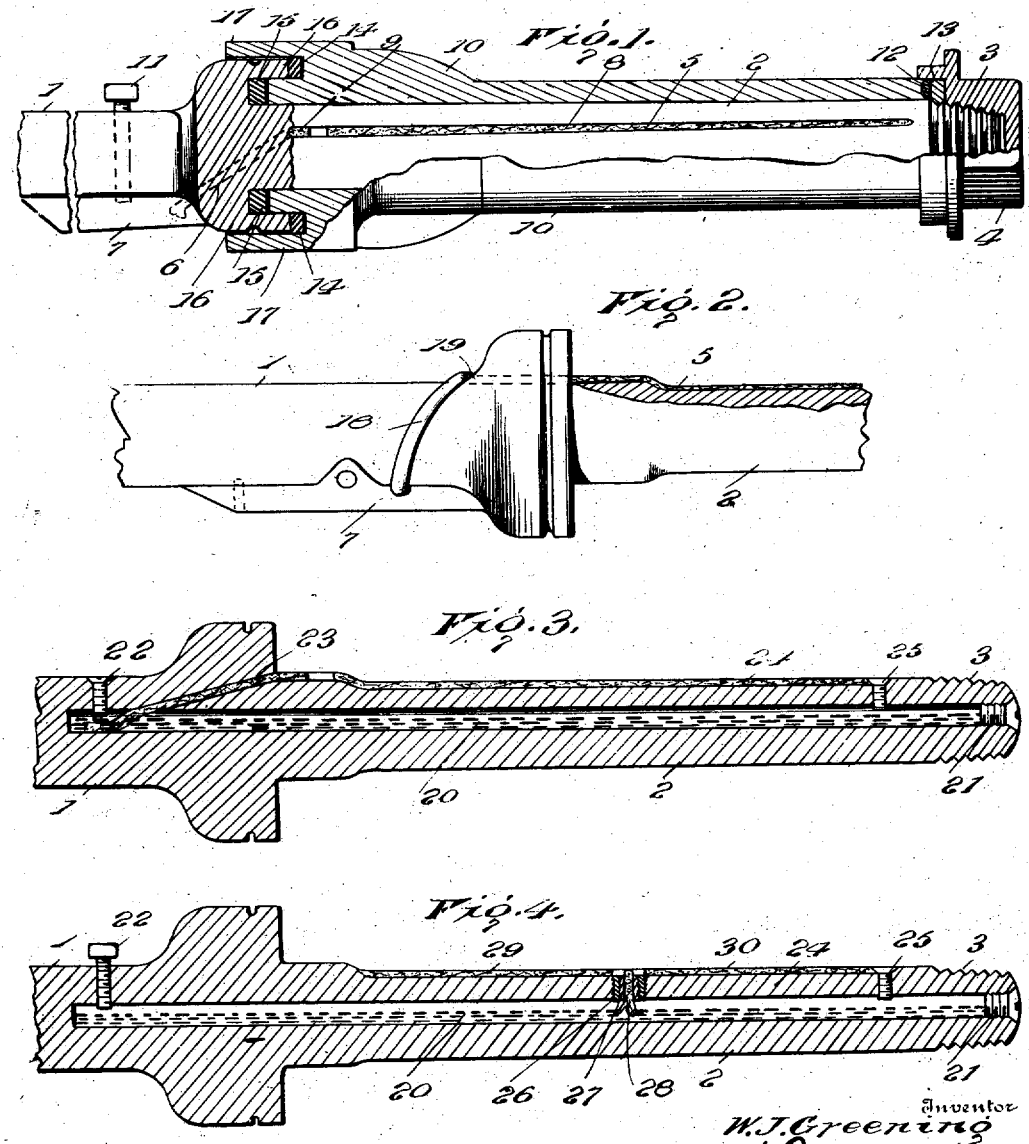

WILLIAM J. GREENING, OF MIDDLETOWN, NEW YORK.

LUBRICATING MEANS FOR AXLES OR THE LIKE.

No. 851,201.    Specification of Letters Patent.    Patented April 23, 1907.

Application filed September 4, 1906. Serial No. 333,206.

*To all whom it may concern:*

Be it known that I, WILLIAM J. GREENING, a citizen of the United States, residing at Middletown, in the county of Orange and State of New York, have invented certain new and useful Improvements in Lubricating Means for Axles or the Like, of which the following is a specification.

The object of this invention is to provide a novel form of lubricating means, which in its preferred adaptation is particularly designed for accomplishing a thorough and effective lubrication of axles of wheels, but which in the carrying out of its principle of operation, may be used or applied in connection with shafts and rotating bodies such as pulleys or wheels mounted thereon as well as in various other ways.

The invention is of that type of lubricating means including the use of a reservoir to contain a suitable lubricant such as oil, together with wicking or absorbent material arranged to apply oil directly to the contacting movable parts and adapted to supply said oil by capillary attraction.

Peculiar means for construction is employed to regulate the quantity of oil which is fed or supplied to the relatively movable axle and wheel, or contacting parts, and such means forms an essential feature of the present invention.

For a full understanding of the invention and the merits thereof and also to acquire a knowledge of the details of construction of the means for effecting the result, reference is to be had to the following description and accompanying drawings, in which:

Figure 1 is a view in elevation, and partly in section, of an axle with an axle box thereon and showing the practical embodiment of the invention. Fig. 2 is a modification of the construction in Fig. 1. Figs. 3 and 4 are further modifications of the invention.

Corresponding and like parts are referred to in the following description and indicated in all the views of the drawings by the same reference characters.

Specifically describing the invention the numeral 1 indicates an axle having the usual spindle 2 the outer extremity of which is threaded as 3 to receive the nut 4. Formed longitudinally of the spindle 2 and near its upper portion is a groove or kerf 5 which terminates at one end near the outer threaded portion of said spindle. Communicating with the groove 5 is a downwardly inclined opening 6 which leads from the inner end of the groove to a reservoir 7 beneath the axle 1, or otherwise suitably located, said opening 6 being designed to supply the lubricant which is contained in the reservoir 7 to the groove 5. The reservoir 7 is adapted to hold a suitable quantity of lubricant such as oil, to lubricate the axle spindle 2 for a very long period as compared with the means ordinarily utilized for the purpose for which applicant's invention is designed. The supply of lubricant in the reservoir 7 will do away with the necessity of frequently removing the wheels of the axles to lubricate the spindle and considerable time and labor is thus saved in the actual use of the invention. Arranged in the groove or kerf 5 is a strip of absorbent material such as wicking 8 which is adapted to be supplied with the lubricant by capillary attraction, the wicking 8 extending nearly throughout the length of the groove 5 terminating a short distance from the inner terminal of said groove. To facilitate the supply of the lubricant from the reservoir 7 to the groove 5, it is preferred that the opening 6 be provided with a length of wicking or absorbent material 9. The wicking 9 in the opening 6, extends upwardly into the adjacent end of the groove 5, but does not connect with the wicking or absorbent material 8 ordinarily.

The purpose of the above arrangement or structure is to admit of regulation of the quantity of lubricant which is supplied to the spindle 2 to effectively lubricate the same with regard to the axle boxing 10 which is mounted thereon. Thus should it be desired to increase the quantity of lubricant which is fed to the groove 5, the wicking 8 will be moved longitudinally of said groove, toward the wicking 9 and thus the supply of lubricant between the parts 2 and 10 will be proportionately increased according to the decrease in the distance between the adjacent end portions of the wicking strips 8 and 9.

The oil or lubricant is supplied to the reservoir 7 in any suitable way and as shown in Fig. 1, a vertical screw 11 passing through a vertical opening in the axle 1, which opening communicates with the reservoir 7, may be removed and the lubricant supplied to the reservoir through this opening. The screw 11 closes the opening above mentioned under normal conditions.

The peculiar arrangement of the wicking strips 9 and 8 is of especial advantage for the reasons hereinbefore set forth. To prevent likelihood of escape of the oil or lubricant from between the axle box 10 and the spindle 2, or in other words, in order that there may be no waste of lubricant or oil, it is contemplated that the outer end of the axle box 10 shall be formed with a groove 12 annularly thereof and the inner portion of the axle nut 4 is adapted to be screwed into firm engagement with a compressible washer 13 received in the groove 12, thereby forming a very tight connection between the axle box and the nut 4, which connection though admitting of free movement of the box 10 relatively to the nut, effectively obviates likelihood of escape of the lubricant at the outer end of the spindle 2. Similar means is provided at the inner end portion of the spindle 2 for preventing water of the lubricant should the latter be supplied a little too freely, under certain conditions of service and this means includes the provision of washers 14 and 15 interposed between the inner portions of the axle box 10 and an annular flange on the spindle 2. The flange 16 is overlapped by a flange 17 on the axle box 10 and the two flanges mentioned preclude the possibility of escape of the lubricant, in connection with the washers 14 and 15 and at the same time prevent dirt, sand, or grit or similar foreign matter from getting between the spindle and the axle box which would give rise to injury thereto.

Fig. 2 illustrates a modification of the construction in Fig. 1, the general principle of the invention still being retained, however. In this instance the lubricating means is designed for use in connection with axles which are not of a very substantial construction and which might be weakened by the formation of the opening 6 in the body portion of the spindle 2. Therefore the reservoir 7 is in communication with a small tube 18 which extends therefrom to the upper portion of the axle at one side of the latter. The upper end of the tube 18, which is a lubricant or oil conveying tube, is in communication with an opening 19 extending horizontally through the annular flange 16 of the spindle, near the point at which said flange joins with the spindle. The opening 19 communicates with the groove 5 which contains the wicking strip 8. The wicking 9 will be disposed in the tube 18 and will be so arranged that the wicking strips 9 and 8 are relatively movable to regulate the flow of the lubricant between the axle spindle 2 and the box 10. Any suitable supply means may be supplied for replenishing the supply of lubricant to the reservoir 7 in the construction in Fig. 2.

In Fig. 3 a further modification of the invention is employed. In this instance the reservoir being indicated at 20 and being constituted by a longitudinal opening or bore centrally of the spindle 2, said opening extending from the outer extremity of the spindle and terminating at its inner end in the body of the axle 1. The outer end of the reservoir 20 is closed by a screw or similar closure 21 and at the inner end the reservoir 20 is provided with a supply opening extending vertically to the top of the axle 1 and also normally closed by a screw 22, the latter being readily removable to facilitate the replenishing of the contents of the reservoir. Leading upwardly from the inner end portion of the reservoir 20 from the body of the spindle 2 is an opening 23 which is equivalent to the opening 6 illustrated in Figs. 1 and 2 and which supplies the lubricant to the groove 24 in the upper portion of the spindle 2. The groove 24 is designed to accomplish the same function as the groove 5 in Figs. 1 and 2 and said groove 24 may have communication at its outer end with the reservoir 20 by means of the opening normally closed by a screw or similar closure 25. In the groove 24 as well as in the opening 23, will be arranged wicking strips, relatively movable and performing the same functions as desired with references to the strips 8 and 9 in the preferred embodiments of the invention. The operation and advantages of the construction in Fig. 3 will be apparent without further description.

Fig. 4 illustrates another modification which is constructed somewhat on the lines indicated in Fig. 3, except that the opening 23 is dispensed with, the lubricant being supplied from the reservoir 20 to the groove 24 intermediate of the ends of the latter. For this purpose an opening 26 leads from the reservoir 20 between the ends of the latter upwardly to an intermediate point in the length of the groove 24 and said opening is threaded in its length to admit of reception of a short threaded tube 27 which latter has a short piece of wicking 28 therein, the tube being notched at its upper portion to facilitate removal or placing in position thereof. The groove 24 contains wicking strips 29 and 30, the ends of which terminate adjacent to the opening 26 and are movable with respect to said opening in order to regulate the quantity of lubricant supplied from the reservoir 20 between the axle spindle and the box.

Having thus described the invention, what is claimed as new is:

1. In lubricating means of the class described, the combination of an axle having the usual spindle, a reservoir carried by the axle, the aforesaid spindle being formed with a longitudinal lubricant receiving groove and a passage establishing communication between the reservoir and the lubricant receiving groove, a wicking strip, or strip of absorbent material in the groove aforesaid, and a similar strip of absorbent material in the passage establishing communication between the groove and the reservoir, the two strips of absorbent material being relatively movable to regulate the quantity of oil or lubricant supplied between the spindle and the boxing mounted thereon.

2. In combination, an axle having a spindle provided with a longitudinal lubricant receiving groove, a reservoir for said lubricant, there being an opening in the body of the axle extending from the reservoir to the groove of the spindle and inclined upwardly in its length, a strip of absorbent material arranged in the opening last mentioned, and a similar strip of absorbent material arranged in the groove of the spindle, the latter being movable relatively to the first mentioned strip of absorbent material to regulate the quantity of lubricant supplied to the spindle.

3. In means of the class described, the combination of an axle having the usual spindle, an oil supply reservoir comprising an opening or bore longitudinally of the spindle, the spindle being formed with a longitudinal lubricant receiving groove there being an opening establishing communication between the groove and the reservoir opening intermediate of the ends thereof, a threaded tube mounted in the said opening, a strip of wicking in said tube, and other strips of wicking or absorbent material in the groove and having ends thereof adjacent to the wicking in the threaded tube and relatively movable with reference to the wicking in said threaded tube.

In testimony whereof I affix my signature in presence of two witnesses.

WILLIAM J. GREENING. [L. S.]

Witnesses:
 JOHN L. WIGGINS,
 D. WILLIS DUSENBERRY.

Correction in Letters Patent No. 851,201.

It is hereby certified that in Letters Patent No. 851,201, granted April 23, 1907, upon the application of William J. Greening, of Middletown, New York, for an improvement in "Lubricating Means for Axles or the Like," an error appears in the printed specification requiring correction, as follows: In line 19, page 2, the word "water" should read *waste;* and that the said Letters Patent should be read with this correction therein that the same may conform to the record of the case in the Patent Office.

Signed and sealed this 28th day of May, A. D., 1907.

[SEAL.]

E. B. MOORE,
*Acting Commissioner of Patents.* tween the groove and the reservoir, the two strips of absorbent material being relatively movable to regulate the quantity of oil or lubricant supplied between the spindle and the boxing mounted thereon.

2. In combination, an axle having a spindle provided with a longitudinal lubricant receiving groove, a reservoir for said lubricant, there being an opening in the body of the axle extending from the reservoir to the groove of the spindle and inclined upwardly in its length, a strip of absorbent material arranged in the opening last mentioned, and a similar strip of absorbent material arranged in the groove of the spindle, the latter being movable relatively to the first mentioned strip of absorbent material to regulate the quantity of lubricant supplied to the spindle.

3. In means of the class described, the combination of an axle having the usual spindle, an oil supply reservoir comprising an opening or bore longitudinally of the spindle, the spindle being formed with a longitudinal lubricant receiving groove there being an opening establishing communication between the groove and the reservoir opening intermediate of the ends thereof, a threaded tube mounted in the said opening, a strip of wicking in said tube, and other strips of wicking or absorbent material in the groove and having ends thereof adjacent to the wicking in the threaded tube and relatively movable with reference to the wicking in said threaded tube.

In testimony whereof I affix my signature in presence of two witnesses.

WILLIAM J. GREENING. [L. S.]

Witnesses:
JOHN L. WIGGINS,
D. WILLIS DUSENBERRY.

---

Correction in Letters Patent No. 851,201.

It is hereby certified that in Letters Patent No. 851,201, granted April 23, 1907, upon the application of William J. Greening, of Middletown, New York, for an improvement in "Lubricating Means for Axles or the Like," an error appears in the printed specification requiring correction, as follows: In line 19, page 2, the word "water" should read *waste;* and that the said Letters Patent should be read with this correction therein that the same may conform to the record of the case in the Patent Office.

Signed and sealed this 28th day of May, A. D., 1907.

[SEAL.]

E. B. MOORE,
*Acting Commissioner of Patents.*

Correction in Letters Patent No. 851,201.

It is hereby certified that in Letters Patent No. 851,201, granted April 23, 1907, upon the application of William J. Greening, of Middletown, New York, for an improvement in "Lubricating Means for Axles or the Like," an error appears in the printed specification requiring correction, as follows: In line 19, page 2, the word "water" should read *waste;* and that the said Letters Patent should be read with this correction therein that the same may conform to the record of the case in the Patent Office.

Signed and sealed this 28th day of May, A. D., 1907.

[SEAL.]

E. B. MOORE,
*Acting Commissioner of Patents.*